United States Patent [19]

Kim et al.

[11] 4,223,296
[45] Sep. 16, 1980

[54] ENGINE KEY REMINDER SYSTEM FOR AUTOMOBILE

[76] Inventors: Mujo Kim, 55 Kujocho; Yonsu Kim, 42 Kiyomizucho, both of Kisshoin, Minami-ku, Kyoto, Japan

[21] Appl. No.: 965,616

[22] Filed: Dec. 1, 1978

[51] Int. Cl.$^2$ ............................................. B60Q 5/00
[52] U.S. Cl. .............................. 340/52 D; 340/568; 307/10 R
[58] Field of Search ............ 340/52 D, 52 F, 53, 340/63, 64, 545, 568; 307/10 R; 180/103

[56] References Cited

U.S. PATENT DOCUMENTS

| | | | |
|---|---|---|---|
| 2,761,121 | 8/1956 | Caporale | 340/52 D |
| 3,818,432 | 6/1974 | Keating | 340/52 D |

*Primary Examiner*—Alvin H. Waring
*Attorney, Agent, or Firm*—Darby & Darby

[57] ABSTRACT

Systems for reminding the automobile driver who is leaving his car of his engine key inadvertently left behind in the engine key switch of the car before he shuts car doors in locked condition from outside the car. In one system, if the driver or his fellow passenger opens at least one of the front car doors with the engine key inadvertently left inserted in the key switch and tries to manually set a conventional door locking mechanism for the open front door in lock-ready condition, then an electrical circuit for the system is completed to energize a sound generator or an electric lamp causing it to produce a warning signal. In another system, the manual setting of the door locking mechanism in lock-ready condition is prevented under the same situation, thus reminding the driver of his left-behind engine key.

4 Claims, 3 Drawing Figures

ENGINE KEY REMINDER SYSTEM FOR AUTOMOBILE

BACKGROUND OF THE INVENTION

This invention relates to systems for reminding an automobile driver who is leaving his car to take the engine key with him. In particular, this invention relates to warning systems for reminding the outgoing automobile driver of his left-behind engine key before he shuts the car door in locked condition.

Today's automobiles are equipped with door locking mechanisms for locking doors tight against any undesired opening during driving and parking. A locking knob or lever is provided on the inside of each car door for setting the associated locking mechanism in locked or lock-ready condition. For safety's sake, when starting the car, the driver is expected to lock the car doors himself by depressing or otherwise manipulating the locking knobs or levers, or ask his fellow passengers to do so. When leaving his car, the driver or his fellow passengers are expected to first open the doors, get out, set the door locking mechanisms in lock-ready condition by manually operating the locking knobs and shut the doors tight in locked condition. The locked car doors cannot be opened without a key commonly called "engine key".

As is well known, the present day automobile includes an electrical system which generally comprises a storage battery, charging generator, starting motor, lighting system, ignition system, and various accessories and controls. In order to start and stop the automobile or specifically its engine, the electrical system must be energized or deenergized. For this purpose, a key switch commonly called an "engine switch" or "ignition switch" is included in the automobile electrical system. The engine key is adapted to be inserted in a keyhole of the key switch and rotated to different positions for controlling the electrical system. Thus, when starting the car, the driver must insert his engine key in the keyhole of the switch and rotate the key to its IGNITION or ON position. When leaving the car, he is expected to rotate the engine key back to its OFF position, pull the key out of the keyhole and get out of the car with the engine key in his hand. But an absent-minded driver sometimes forgets to take the engine key out of the keyhole. He moves out of the car leaving the engine key behind in the keyhole of the switch and lock the car doors tight closed. If this happens, he can never again get in and start his car unless he has a spare key on hand since the locked car doors are not reopened without the key. The normal fact is that he has no spare key on hand. Such inconvenience would be avoided if the outgoing driver is reminded of his left-behind engine key before he locks the car doors tight closed.

Therefore, it is a general object of this invention to provide a system for reminding a driver who is to leave his car of an engine key inadvertently left in the key switch before he or his fellow passenger shuts the car doors in locked condition.

It is an object of this invention to provide a system for producing a warning signal when the driver leaving his car attempts to set the door locking mechanism in lock-ready condition inadvertently keeping the engine key inserted in the keyhole of the key switch.

It is another object of the invention to provide a system for preventing the door locking mechanism from being set in lock-ready condition when the driver leaving his car attempts to do so inadvertently keeping the engine key inserted in the keyhole of the key switch.

SUMMARY OF THE INVENTION

Briefly stated, an engine key reminder system embodying the invention in one form includes a source of electric current and a first normally open switch electrically connected to the source. The first switch is associated with the key switch on the automobile and is adapted to be kept closed while the engine key is inserted in the keyhole of the key switch regardless of the key positions. A second switch is provided with respect to each of at least the front car doors and is closed when the associated front door is opened. A third switch is provided in operative relation with each door locking mechanism for the front doors such that the third switch is closed when the door locking mechanism is manually set by the driver or his fellow passenger. The second and third switches for each front door are series connected to one another and to the source, while the second and third switches for one front door are connected in parallel to the second and third switches for the other front door. A suitable electrically operated warning means for producing the audible or visible signal is inserted between the parallel connected switches and the source of electric current.

As the driver wishing to leave his car opens at least one of the front door inadvertently keeping the engine key in the switch keyhole, both the key associated first switch and the door associated second switch are closed. The driver will then set the door locking mechanism for the open front door, thereby closing the third switch. With the first, second and third switches closed, the electric current is supplied from the source through the warning means which, in turn, produces the audible or visible signal to indicate that the engine key is left inserted in the key switch.

In another form of the invention, the engine key reminder system includes instead of the third switches described above, at least two electromagnetic means. Electromagnetic means are associated with respective front door locking mechanisms and each comprises a coil and a movable ferromagnetic member. Upon energization of the coil, the ferromagnetic member is magnetically attracted toward the coil into such position as to prevent the door locking mechanism from being set by the driver or his fellow passenger. The coils are connected in series with respective door associated second switches and in parallel to each other. As the driver wishing to leave his car opens at least one of the front doors inadvertently keeping the engine key inserted in the key switch, both the key associated first switch and the door associated second switch are closed. Upon closing of the first and second switches, the electric current flows from the source through the coil of the electromagnetic means thereby energizing the coil. Energization of the coil, in turn, brings the movable ferromagnetic member into the lock interrupting position. Thus, the driver will unsuccessfully try to set the door locking mechanism of the open front door and notice that he has forgotten to pull the engine key out of the key switch.

DETAILED DESCRIPTION OF THE PREFERRED EMBODIMENTS

Figure 1:
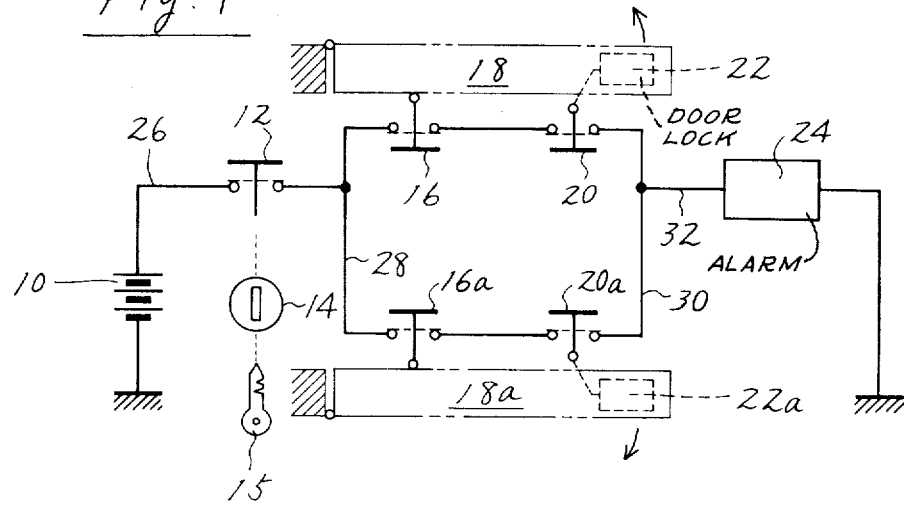
FIG. 1 is a schematic illustration of an engine key reminder system according to one form of the invention.

Referring now to the drawings, in particular to FIG. 1, there is illustrated an electrically operated system for informing an automobile driver of his engine key inadvertently left inserted in the key switch according to one preferred embodiment of the invention. The system includes a suitable source of electric current 10 and a first switch 12 which is electrically connected to the source. The source of electric current may be a storage battery of the automobile as shown. The switch 12 is associated with the engine key switch 14 on the automobile and is kept closed while the engine key 15 is inserted in the mating keyhole of the key switch 14 regardless of the key positions. The key associated switch 12 is made open when the engine key 15 is pulled out of the keyhole of the key switch. The system also includes second switches 16 and 16a operatively associated with front doors 18 and 18a, respectively, of the car and third switches 20 and 20a operatively associated with conventional door locking mechanisms 22 and 22a, respectively, for the front doors. The operative association of the second switches 16 and 16a with respective front doors 18 and 18a is such that the switches are kept open while the front doors are closed and they are closed when the front doors are open. Similarly, the operative association of the third switches 20 and 20a with respective door locking mechanisms 22 and 22a is such that the switches are kept open while the locking mechanisms are released and they are closed when the locking mechanism are set in locked or lock-ready condition. As shown, the switch 16 for the door 18 and the switch 20 for the door locking mechanism 22 are series connected to each other and to the key associated switch 12, while the switch 16a for the door 18a and the switch 20 for the door locking mechanism 22a are series connected to each other and to the key associated switch 12, with the series connected switches 16 and 20 being in parallel circuit to the series connected switches 16a and 20a. A device 24 for producing audible signal or sound e.g. a buzzer is electrically inserted between the source 10 and the parallel connected switches to complete the elctric circuit of the system.

When the driver wishes to leave his car, he is expected to first turn off the engine switch 14 by manually rotating the switch key 15 back to its OFF position, pulls the key out of the keyhole of the switch. He then opens one of the front doors 18 and 18a, gets out of the car, sets the door locking mechanism 22 or 22a for the open door in lock-ready condition by manually operating the locking knob or lever of the mechanism, closes the door from outside causing it to be locked tight, and departs his car. As long as this course of action is followed by the departing driver, the illustrated system of the invention does not operates since the key associated switch 12 in the system circuit is kept open due to the fact that the engine key 15 has been taken out of the keyhole of the key switch 14. With the key associated switch being open, the warning buzzer 24 remains deenergized producing no sound. The driver may inadvertently fail to pull out the engine key after turning off the key switch by rotating the key back to OFF position, and wishes to get out and leave his car. With the engine key 15 kept inserted in the keyhole of the switch 14, the key associated switch 12 in the circuit remains closed. Under the circumstance, if the driver, wishing to leave the car, opens one of the front doors, e.g. the left front door 18a, the door associated switch 16a for the open left front door is closed. The driver then goes on to manually set the locking mechanism 22a for the open door in lock-ready condition, thus closing the associated locking switch 20a. Upon closing of the switch 20a, the circuit is completed and the electric current is supplied from the source 10 via line 26, closed switch 12, line 28, closed switches 16 and 20a, lines 30 and 32 to the buzzer 24 causing the buzzer to produce the audible warning signal. The driver is now reminded that he has failed to take the engine key out of the key switch. It is noted that the warning sound is produced by the illustrated system when the leaving driver manually sets the door locking mechanism and before the door is shut tight from outside in locked condition. The operation of the engine key reminder system has been explained with reference to the left front door 18a being opened by the driver. However, the system operates in the same manner when the driver or his fellow passenger opens the other front door, i.e. the right front door, and attempts to set the locking mechanism for the door inadvertently leaving the engine key behind in the keyhole of the switch. In that case, the door associated switch 16 and door lock switch 20 are closed together with the key associated switch 12 to make the warning circuit of FIG. 1. Accordingly, the undesired situation where the driver finds out that he has left the engine key inserted in the key switch after shutting the car doors in locked condition from outside is effectively prevented by the warning system of the invention. Although, in the illustrated embodiment, a buzzer is shown as the audible warning device, the horn on the automobile may be used instead. Or alternately, a suitable visual warning device such as a colored lamp may be utilized.

Figure 2:
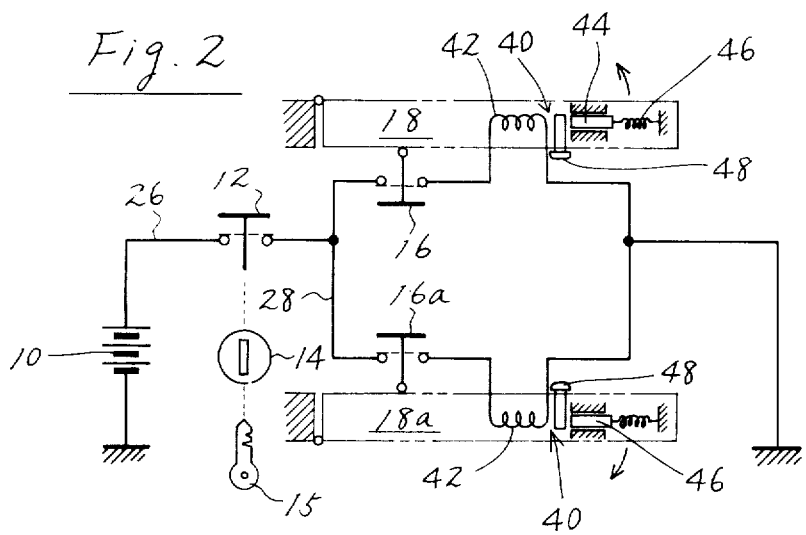
FIG. 2 is a schematic illustration of an engine key reminder system according to another form of the invention.

In FIG. 2, there is illustrated an engine key reminder system according to another preferred embodiment of the invention. The system of FIG. 2 is basically the same in construction as that of FIG. 1 and the same reference numerals are used for components in FIG. 2 which are identical to component parts described in conjunction with FIG. 1. While the system of FIG. 1 is arranged such that it produces audible or visual warning signal when the outgoing driver attempts to set the door locking mechanism in lock-ready condition leaving inadvertently his engine key inserted in the key switch, the system shown in FIG. 2 is adapted to prevent the door locking mechanism from being set in lock-ready condition by the driver or his fellow passenger when the same situation occurs. As shown in FIG. 2, the system includes a storage battery 10 for the source of current and a switch 12 associated with the key switch 14. Switches 16 and 16a associated, respectively, with the left and right front doors 18 and 18a are also provided in series connection with the key associated switch 12 and in parallel circuit to each other. As in the previous embodiment, the key associated switch 14 is normally open and is kept closed while the engine key 15 is inserted in the mating keyhole of the key switch 14 regardless of whether the engine key is in its ON or OFF positions. Similarly, the door associated switches 16 and 16a are open while the front car doors are closed and they are closed when their respective front car doors are opened.

Figure 3:
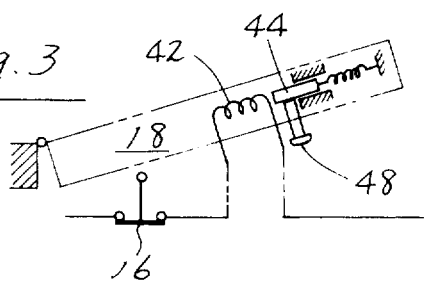
FIG. 3 is a partial schematic illustration showing the system of FIG. 2 in operating condition.

In order to prevent the door locking mechanism from being set into lock-ready condition, door lock prevention mechanisms 40 are provided for the front doors. The door lock prevention mechanisms 40 for the right and left front doors 18 and 18a are identical in construction and function to each other, and only one of the door lock prevention mechanism 40 for the right front door 18 will be described in detail. The door lock prevention mechanism 40 comprises an electromagnetic solenoid which includes a coil 42 and a movable plunger 44 disposed preferably within the car door 18. The solenoid coil 42 is electrically series connected to the door associated switch 16. The plunger 44 is normally biased into a retracted position as shown in FIG. 2 by a spring means 46 and is pulled out from its retracted position toward the coil 42 as shown in FIG. 3 when the solenoid coil is energized. The reference numeral 48 shows a locking knob or lever of the door locking mechanism. When the knob 48 is manually depressed, the door locking mechanism is set in locked or lock-ready condition. On the other hand, as the knob is pulled out, the locking mechanism is released i.e. brought out of the locked or lock-ready state.

According to the invention, the solenoid plunger 44 of the lock prevention mechanism is so arranged and related with respect to the locking knob 48 that when the plunger is electromagnetically attracted toward the coil 42, it is disposed across the path of movement of the locking knob (see FIG. 3), thereby obstructing the depression of the knob, and when the plunger is pulled back into its retracted position, it moves out of the path of movement of the locking knob (see FIG. 2), thereby allowing the depression of the knob.

With this arrangement, the key reminder system of FIG. 2 operates as follows. If an absentminded driver wishes to leave his car, he would do so without taking the engine key 15 out of the key switch 14. Thus, he opens one of the front doors, e.g. the door 18 leaving the engine key 15 inserted in the key hole of the switch 14. With the key in the key switch, the key associated switch 12 of the system is kept closed. The opening of the front door 18 closes the door associated switch 16. At this moment, the electric current is supplied from the buttery 10 via line 26, losed switch 12, line 28, closed switch 16 through the solenoid coil 42 thus energizing the coil. Upon energization of the coil 42, the plunger 44 is magnetically pulled toward the coil into the position across the path of movement of the locking knob 48 as shown in FIG. 3. The outgoing driver will then try to manually depress the locking knob and shut the door tight in locked condition from outside. However, with the plunger kept across the path of movement of the locking knob by the energized coil, the knob cannot be depressed into the lock-ready state. The driver will notice that something is wrong, i.e. he has left his engine key behing in the key switch.

On the other hand, if the driver is careful enough, as expected, to pull the engine key out of the key switch before leaving his car, the above-described operation of the system does not occur. That is to say, when the careful driver takes his engine key out of the key switch, the key associated switch 12 of the system is kept open. With the key associated switch being open, the circuit of FIG. 2 is not completed even when the door associated switch 16 is closed by the driver opening the front door 18. Thus, the solenoid coil 42 is kept de-energized and the plunger 44 is being biased in its retracted poistion away from the path of movement of the locking knob 48 allowing the knob to be manually depressed into the lock-ready state by the driver.

The lock prevention mechanism 40 for the other front door 18a operates in the same manner as described above with respect to the lock prevention mechanism 40 for the right front door 18. Although the solenoid having a coil and movable plunger is used in the illustrated embodiment, other suitable electromagnetic means such as the combination of an electric coil and a movable ferromagnetic member may also be used to advantage.

As fully described hereinabove, the system of the invention functions to remind a driver who is leaving his car of his engine key left behind in the key switch before he shuts the car door tight locked from outside the car. Thus, any inconvenience which occurs when the driver takes notice of his engine key inadvertently left inserted in the key switch only after closing the car door locked from outside is effectively eliminated. The system of the invention is inexpensive and simple in construction with only a few component parts. It is readily incorporated into any make of automobile without necessarily changing the design thereof.

What we claim is:

1. A system for an automobile for reminding a driver of an engine key inadvertently left inserted in an engine key switch of the automobile in which the automobile has at least one door with a locking mechanism comprising:

a source of electric current;

a first switch associated with said key switch and adapted to be kept closed while said engine key is inserted in said key switch, said first switch being connected to said source of electric current;

a second switch associated with at least one of the front doors of the automobile and adapted to be closed when said door is opened, said second switch being series connected to said first switch;

electrically operated means associated with a door locking mechanism for said at least one door and operative to remind the driver of said engine key, said electrically operated means including;

a third switch electrically connected in series circuit to said second switch, and electrically operated signal generating means connected in series circuit to said third switch, said third switch being operatively connected to said door locking mechanism such that said third switch is closed when said door locking mechanism is operated for locking action, whereby said signal generating means is energized to produce a reminder signal when said first, second and third switches are closed.

2. A system as defined in claim 1 wherein said signal generating means comprises a buzzer for producing an audible signal.

3. A system a defined in claim 1 wherein said signal generating means comprises an electric lamp for producing a visible signal.

4. In a system for reminding an automobile driver of an engine key inadvertently left inserted in an engine key switch of an automobile of the type including door locking means associated with a door and having a door locking member which is movable between a door locking position and a door unlocking position, and door lock control means which is manually operable between a first position allowing said door locking member to be moved to said door locking position and a second position preventing said door locking member from being moved to said door locking position, said door locking member being automatically pressed in said door locking position when said door is closed with said door lock control means maintained in said first position, the improvement comprising:

a. a source of electric current;
b. first switch means associated with said engine key switch and adapted to be kept closed while said engine key is inserted in said key switch, said first switch means connected in series with said source of electric current;
c. second switch means associated with at least one of the doors of said automobile and adapted to be kept closed when said at least one door is opened, said second switch being connected in series to said first switch means; and
d. a door lock prevention mechanism for preventing said door locking member from being moved to said door locking position, said door lock prevention mechanism including an electric coil which is connected in series to said second switch means and is energized when said first and second switch means are closed, and a member movable by energizing and de-energizing said electric coil between a first position engageable with said door locking member, so as to prevent said door locking member from being moved to said door locking position and a second position disengagable with said door locking member, allowing said door locking member from being moved to said door locking position, said member being in said first position when said first and second switch means are closed.

* * * * *